United States Patent [19]

Purdy

[11] 3,874,530

[45] Apr. 1, 1975

[54] GRAIN CART

[76] Inventor: George W. Purdy, 601 S. Jefferson, Dewitt, Ark. 72043

[22] Filed: Oct. 5, 1973

[21] Appl. No.: 403,882

[52] U.S. Cl. .................. 214/83.32, 280/104.5 A
[51] Int. Cl. ............................................ B60p 1/40
[58] Field of Search ............ 280/104.5 A, 104.5 R; 214/83.26, 83.32, 17 D; 105/248; 198/64

[56] References Cited
UNITED STATES PATENTS

| | | | |
|---|---|---|---|
| 2,323,458 | 7/1943 | Dunn | 214/83.32 |
| 2,405,727 | 8/1946 | Aaberg | 214/83.32 |
| 2,484,280 | 10/1949 | Fuston | 280/104.5 A |
| 3,638,816 | 2/1972 | Mann | 214/83.26 |

Primary Examiner—Robert B. Reeves
Assistant Examiner—Larry H. Martin
Attorney, Agent, or Firm—Clarence A. O'Brien; Harvey B. Jacobson

[57] ABSTRACT

A grain cart for transporting grain from a harvester or combine operating in the field to a truck or other conveyance employed to convey the grain to a drier or other destination incorporating a body with sloping sides for gravity feed of the grain to unloading augers with a divider assembly dividing the load of grain for gravity feed to the unloading augers. The augers are power driven from a power take-off or the like and the cart is supported for movement over uneven terrain by a tandem supporting wheel assembly. The carrying capacity of the grain cart has been increased by employing a generally funnel-shaped configuration which has been elongated and the two unloading augers converge upwardly to a generally single discharge area for discharging grain into the load body of a truck, or the like, at a substantially single point of discharge.

6 Claims, 6 Drawing Figures

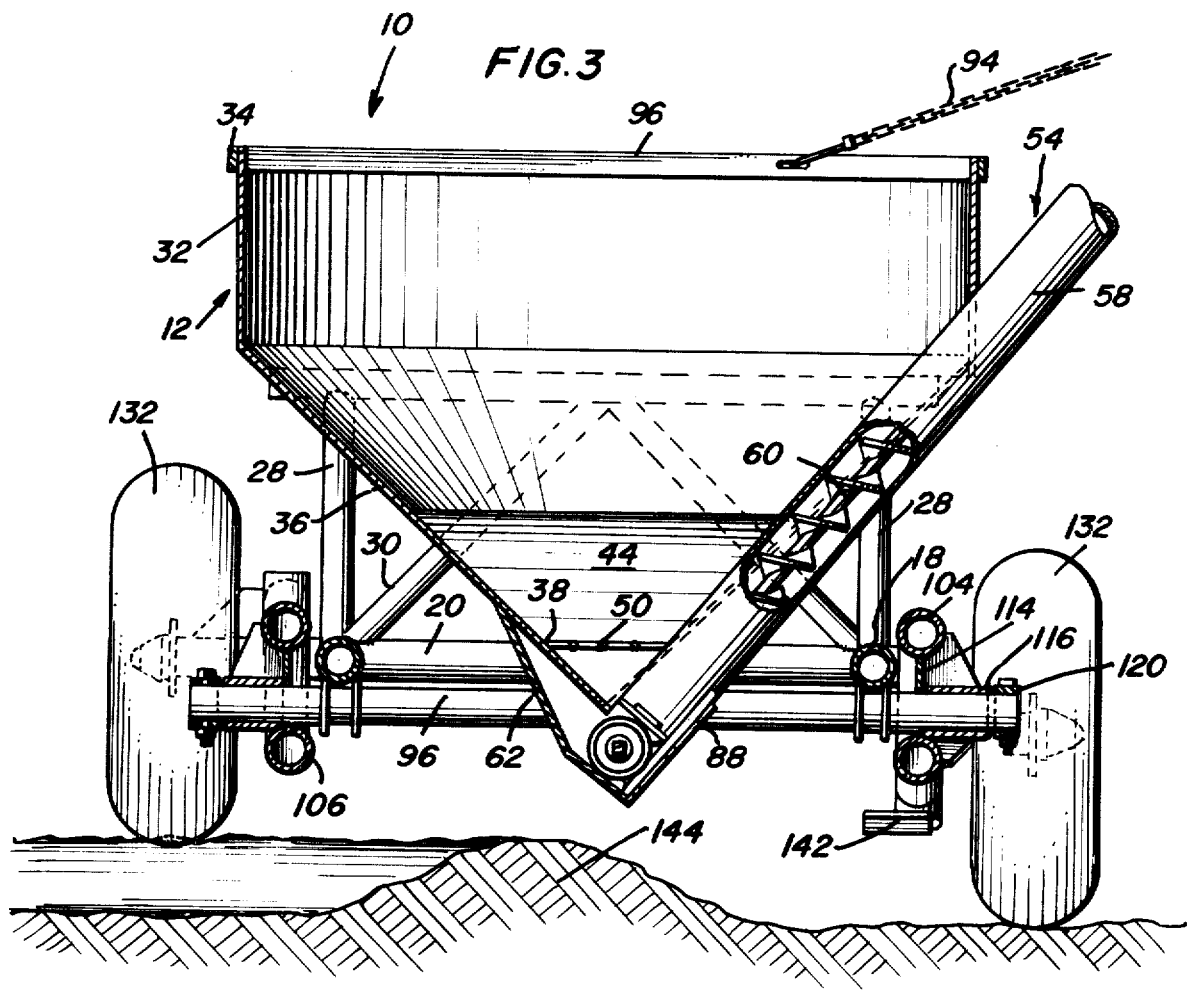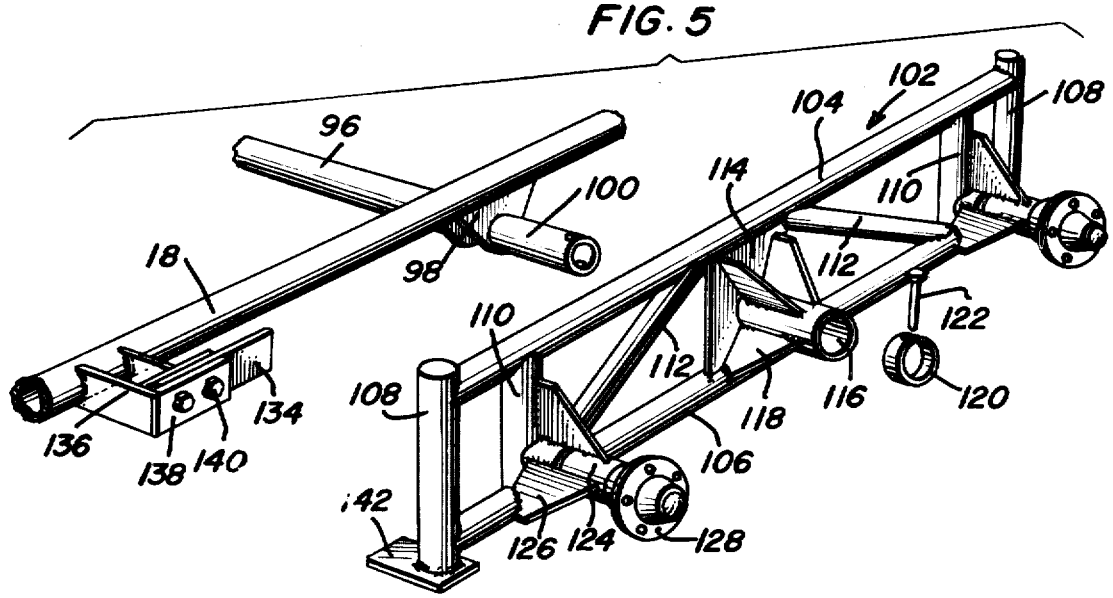

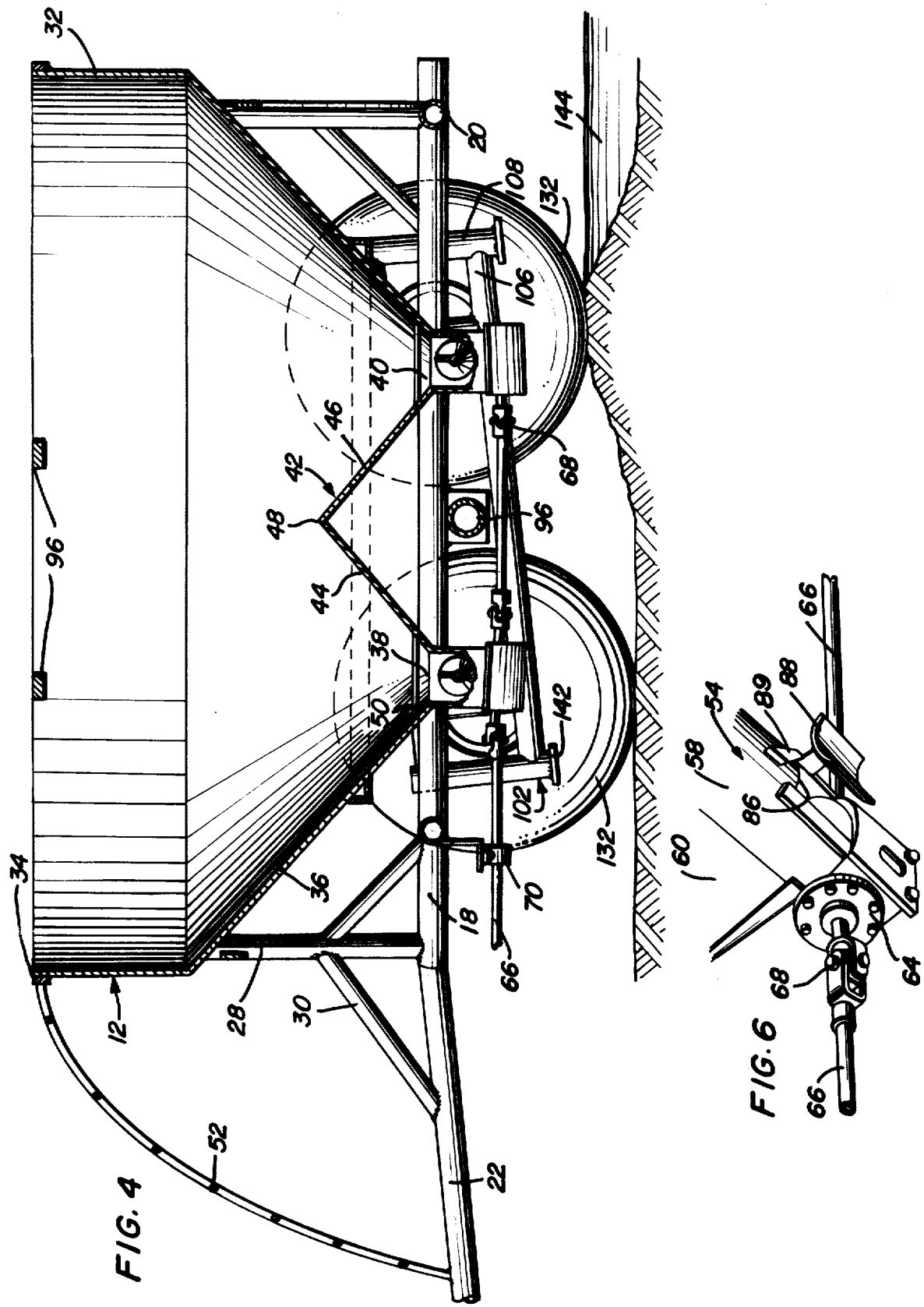

GRAIN CART

BACKGROUND OF THE INVENTION

1. Field of the Invention

The present invention generally relates to grain carts and, more particularly, the type of cart that is utilized to convey grain from a combine operating in the field to a truck oriented adjacent the field but not in the field with the cart including features enabling a large capacity, auger unloading and movement over uneven terrain encountered in the field without the cart tilting and spilling the grain.

2. Description of the Prior Art

In the harvesting of various grain crops, combines are used which include storage bins of limited capacity in which the grain being threshed by the combine is temporarily stored. In some situations, the combine may unload its bin at the end of the field into a truck body or the like. In order to render the combining operation more efficient, the grain in the combine is loaded into a grain conveyance traveling alongside of the combine at the same speed. In a smooth and dry field, this operation presents no particular problems.

In harvesting certain crops, particularly rice, the field has substantial irregularities, such as the normally used levees for confining water to predetermined depths during the growing season. When harvesting this type of crop, the ground is usually wet and soft and the levees render the movement of a truck alongside of a combine impractical. Under such circumstances, a grain cart pulled by a tractor and provided with an auger unloader is utilized in which the cart has relatively large tires for movement over the soft ground surface and also over the uneven terrain. An example of the type of cart which has been used in this operation is illustrated in prior U.S. Pat. No. 2,405,727 in which the cart is provided with a sloping side body, an unloader of the auger type driven by a power take-off from the towing tractor and a single rigid axle rigidly secured to the frame of a cart. While this type of cart has been used extensively, it is limited in its capacity due to the necessity of sloping the walls sufficiently to provide gravity feed to the auger unloader. Additionally, when the cart passes over levees in angular relation thereto, the cart is subject to substantial tilting or whipping which frequently results in spillage of the grain over the side of the cart body. If both wheels engage the levee or ridge at the same time, it frequently occurs that the tractor has insufficient traction to pull the loaded cart over the levee.

Some efforts have been made to increase the capacity of the cart and employ a bottom auger rather than a gravity feed to the unloading auger. However, in practice, the bottom auger is subject to considerable weight when the grain cart is loaded and the bottom auger frequently becomes overloaded and jams. Also, in order to overcome the problem of the two-wheeled cart having a limited capacity due to the problem of the tires sinking into the ground surface, carts have been provided with four wheels in which independent rigid axles support the four wheels. Even with this arrangement, when the cart proceeds over a levee in an angular direction, all of the weight of the cart will be lifted by the first wheel passing over the levee thus still causing tilting or tipping of the cart and if the cart approaches a levee so that both leading wheels engage the levee at the same time, the tractor still has a traction problem of pulling the wheels over the levee since the leading wheels will support the entire weight of the cart until they pass over top of the levee.

Many other vehicles have been provided with unloading augers incorporated into the body, but none of them effectively solve the problem of conveying grain, especially rice, from the combine in the field to a truck on a roadway adjacent the field so that the grain can be effectively trucked to a remote destination, such as a grain drier or the like.

SUMMARY OF THE INVENTION

An object of the present invention is to provide a grain cart having a grain receiving body thereon of generally funnel-shaped configuration but of oval-shaped plan configuration incorporating two unloading augers spaced longitudinally therein together with a divider between the unloading augers to maintain a proper slope to the surfaces of the body for gravity feed of the grain to the unloading augers.

Another object of the invention is to provide a grain cart in accordance with the preceding object in which the cart is supported by a tandem wheel assembly on each side of the cart so that the wheels on each side each support a portion of the load of the cart regardless of the uneven terrain encountered when moving the cart across irregularities in the field, thereby reducing the tendency of the cart to tilt and spill grain over the top edge thereof.

Still another object of the invention is to provide a grain cart in accordance with the preceding objects in which the two unloading augers converge upwardly to discharge at adjacent points and have their upper ends foldable to a substantially horizontal position for ease of movement under overhanging obstructions, such as tree limbs, wires, and the like.

A further object of the invention is to provide a grain cart having a hitch enabling the cart to swivel about a longitudinal axis in relation to a towing vehicle drawbar.

A still further object of the invention is to provide a grain cart in accordance with preceding objects in which the unloading augers are driven from a common powered shaft.

Still another important object of the invention is to provide a grain cart with tandem wheel suspensions on each side thereof with means guiding the movement of the tandem assemblies and limiting the movement of the tandem assemblies about a pivot axis intermediate the two wheels on each side of the cart.

Yet another important feature of the present invention is to provide a grain cart which has increased carrying capacity but yet is capable of approaching and moving over levees in an angular relation without excessive tilting and possible spillage of grain from the top edge of the cart with the cart being relatively simple in construction, long lasting and efficient for its purposes.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a side elevational view of the construction of FIG. 1 illustrating the manner in which the tandem wheel assembly devides the load being supported by each wheel when traversing a levee, such as in a rice field, or the like.

FIG. 3 is a transverse, sectional view of the grain cart illustrating the structural configuration thereof.

FIG. 4 is a longitudinal, sectional view of the grain cart illustrating further structural details thereof.

FIG. 5 is an exploded group perspective view illustrating the beam structure incorporated into the tandem wheel suspension assembly on each side of the cart.

FIG. 6 is a fragmentary perspective view illustrating the lower end of one of the unloading augers including the gear box and clean-out door.

DESCRIPTION OF THE PREFERRED EMBODIMENT

Figure 1:
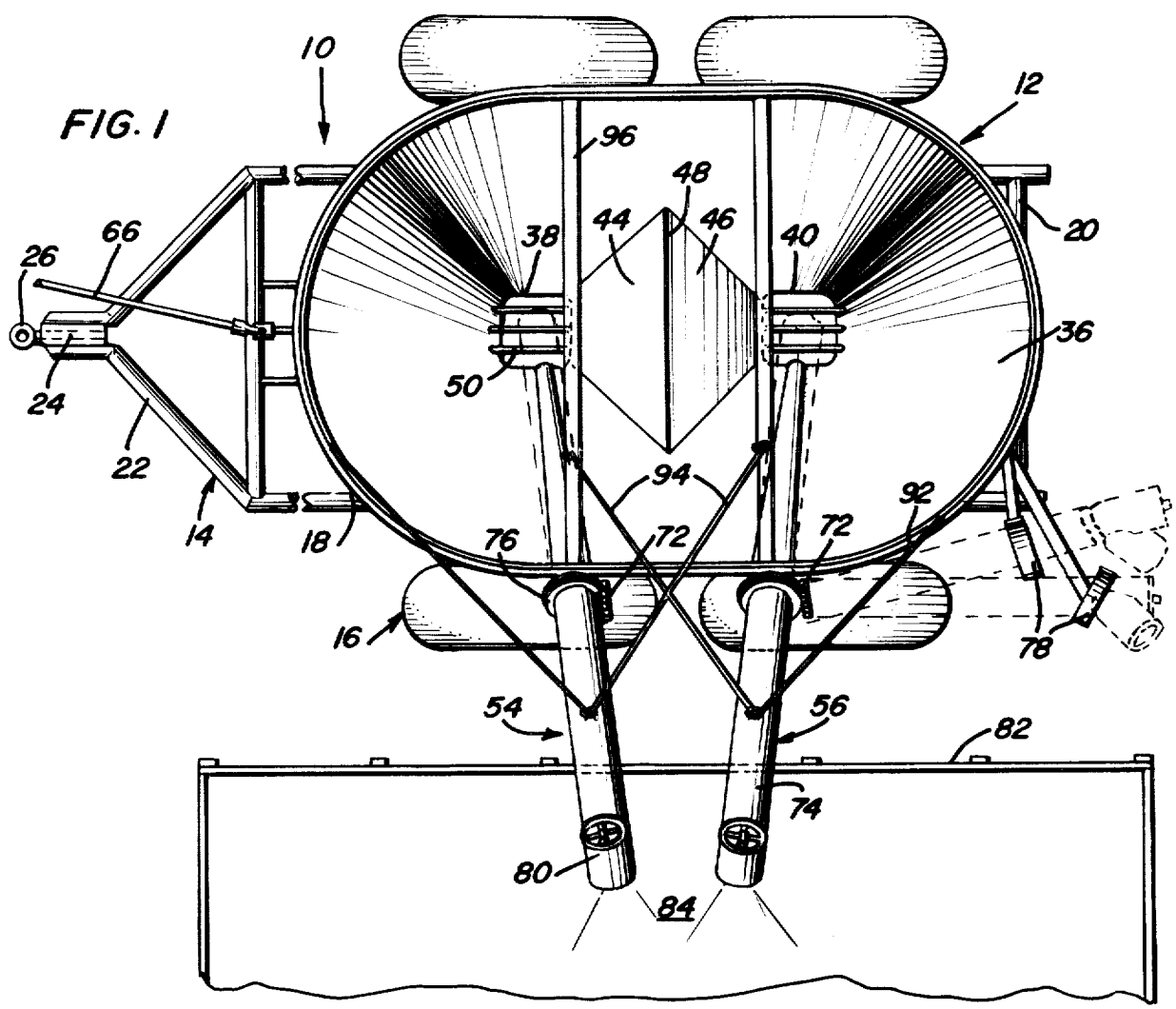
FIG. 1 is a top plan view of the grain cart of the present invention illustrating the configuration of the grain carrying body with the upper ends of the conveyors being illustrated in broken lines in their collapsed condition.

Referring now specifically to the drawings, the grain cart of the present invention is generally designated by the reference numeral 10 and includes a grain carrying body 12 supported from a framework 14 with the framework being supported by a tandem wheel assembly 16 on each side thereof.

The framework 14 is of substantially rectangular configuration and includes longitudinally extending side rails 18 interconnected by transverse members 20. The forward end of the frame is provided with forwardly converging members 22 secured to a longitudinally extending tubular sleeve 24 at the forward end thereof having a hitch member 26 mounted therein for rotational movement or swivelling movement about the longitudinal axis of the frame so that the hitch element 26 may be attached to the drawbar of a tractor without imparting twisting forces or torque thereto during relative tilting of the cart and tractor about a longitudinal axis. The hitch member 26 may be in the form of a loop or eye for receiving a connecting bolt, clevis, or the like. The frame 14 also includes vertical supporting members 28 which are suitably braced as at 30 for rigidly supporting the load carrying body 12. The particular construction of the frame members may be varied, as desired, with rigid tubular members being preferred although other structural shapes may be employed. The components of the frame are rigidly affixed to each other by welding or the like and transverse inclined bracing may be employed wherever desired and longitudinal bracing may be employed where desired to provide rigidity to the load carrying body 12.

The load carrying body 12 includes a vertically disposed upper wall portion 32 having a substantially horizontal upper edge 34 with the wall portion 32 being generally oval-shaped in configuration as illustrated in FIG. 1. Extending downwardly from the lower edge of the oval-shaped vertical wall 32 is a peripheral sloping wall 36 which is generally funnel- shaped in configuration and is in the form of a conical member which has been vertically severed and elongated thereby providing an elongated oval- shaped configuration which has an angle of slope throughout greater than the angle of repose of the grain disposed in the body 12 so that grain will gravity feed down the sloping inner surfaces of the inclined perpheral wall 36.

The bottom of the inclined sloping wall 36 is provided with a pair of longitudinally spaced discharge openings 38 and 40. Between the openings 38 and 40, the body 12 is provided with a partition or divider generally designated by the numeral 42 which includes a forward sloping wall 44 and a rearward sloping wall 46 with the two sloping walls 44 and 46 joining at their upper ends in a ridge 48 extending transversely and horizontally between opposite side portions of the oval-shaped wall 36 as illustrated in FIGS. 1 and 4. The bottom edges of the walls 44 and 46 join with the adjacent edges of the openings 38 and 40 as illustrated in FIG. 4 thereby defining a gravity feed into each of the openings 38 and 40 with the angle of the walls 44 and 46 being greater than the angle of repose of the grain supported in the body. With this construction, gravity feed of the grain is accomplished throughout the entire area of the body 12 since all surface areas thereof are inclined at an angle greater than the angle of repose of the grain.

Each of the discharge openings 38 and 40 is provided with horizontally disposed and spaced bars or rods 50 to preclude large objects from passing through the openings 38 and 40 and to provide safety in the event that any such large objects are accidentally positioned in the load carrying body 12. An arcuate ladder 52 is provided from the top forward edge of the load body 12 to the frame adjacent the front thereof to enable access to the interior of the body to enable cleaning, inspection, and the like.

Figure 2:
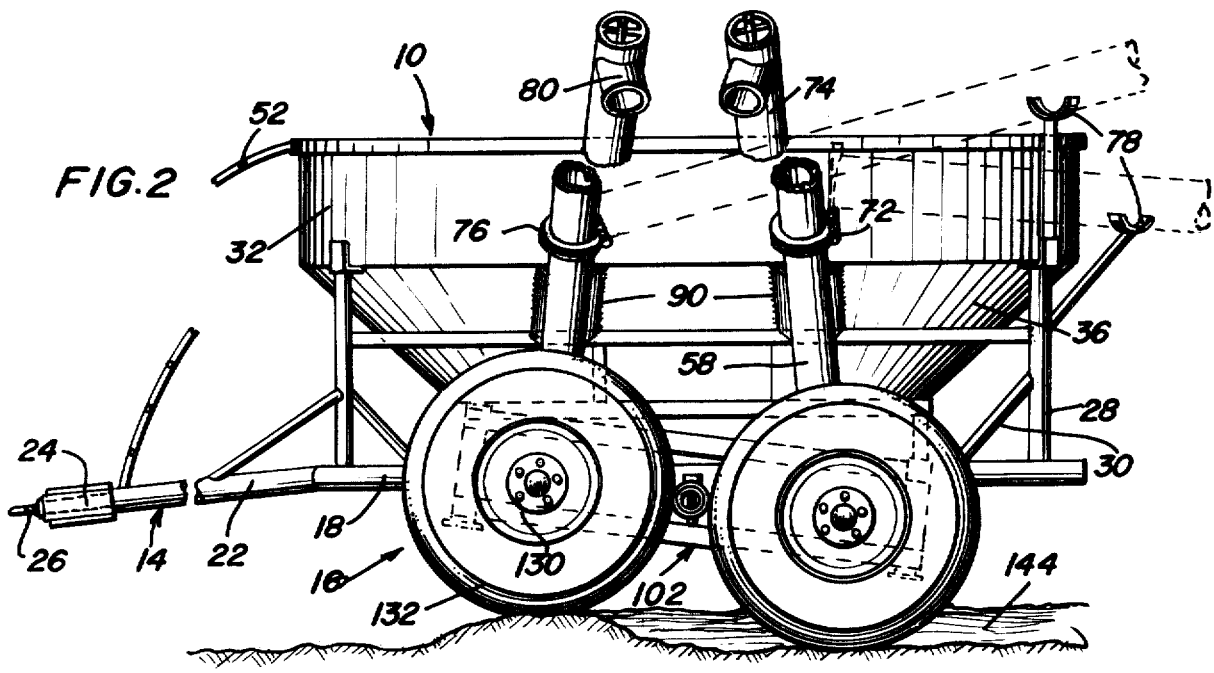

Disposed below the two discharge openings 38 and 40 in communication therewith is a pair of unloading auger assemblies 54 and 56, each of which includes a tubular housing 58 and a screw auger 60 therein. The lower end of the tubular housing 58 is connected with adapter flanges 62 to provide communication between the discharge openings and the lower ends of the unloading auger assemblies. The lower end of each unloading auger assembly includes a gear box drive arrangement 64 for driving the screw auger 60 with the gear box arrangement being connected with an articulated drive shaft 66 have universal joints 68 incorporated therein. The drive shaft 66 extends to a point forwardly of the frame and ultimately connects through the power takeoff from a tractor or the like with the forward portion of the power take-off being journaled in a suitable bearing block 70 supported from the frame. As illustrated in FIG. 1 and 2, the unloading auger assemblies 54 and 56 converge upwardly so that the portions of the shaft 66 which extend through the gear box drive 64 are slightly angularly related to each other. The universal joints 68, as illustrated in FIG. 4, provide for the single drive shaft driving both of the unloading auger assemblies.

Also, the upper portion of each auger is provided with a hinge connection 72 which enables the upper end portion 74 to fold rearwardly about a hinge connection defined by a flange joint 76. Props 78 are provided for supporting the upper end portions 74 of the unloading auger assemblies when in their collapsed condition so that the cart may be driven under overhanging obstructions, such as under trees, power lines, and the like. The auger assemblies are provided with discharge spouts 80 which discharge into the load body 82 of a truck or the like at a substantially single area of discharge as indicated at 84. The screw augers 60 within the housings will break at the hinge joint and are provided with a suitable disengageable connection in alignment with the hinge. The specific supporting structure for the screw auger and its relationship to the housing 58 is conventional and at the lower end thereof, a clean-out opening 86 is provided in the housing 58 and a closure panel 88 is provided therefore to enable the auger assembly to be cleaned when necessary. The panel 88 is stored in open position by suitable brackets 89 to enable water to drain from the cart when not in use.

The housings 58 are secured to the load body 12 by suitable attaching flanges 90 and the upper end portions 74 may be secured in place by flexible tension members 92 extending forwardly and rearwardly respectively and being attached to the upper edge of the body 12 and crossed tension members 94 extending inwardly and being connected to spaced parallel transverse reinforcing member 96 extending across the central portion of the body 12 as illustrated in FIG. 1 with the tension members 92 and 94 being disconnected or released when the upper end portions 74 are to be folded rearwardly and forming means for securing the outer end portions 74 in position securely when in their operative condition.

The tandem wheel assembly 16 on each side of the cart includes a transverse axle shaft 96 supported rigidly in depending relation from the side rails 18 by triangular bracket plates 98 thereby providing a rigid stud axle 100 projecting from each side of the frame generally centrally under the load carrying body 12. Mounted on the stud axle 100 is a frame or walking beam assembly 102 which includes parallel upper and lower members 104 and 106 interconnected rigidly by end members 108, vertical intermediate members 110, inclined brace members 112 and a central vertical plate 114. The central vertical plate 114 includes a tubular sleeve 116 thereon rigidified by gusset plates 118 and journaled on and received on the stud axle 100, thus rockably supporting the frame or beam 102 on the stud axle 100 for rocking movement of the assembly about the axis of the stud axle 100. The sleeve 116 is secured on the stud axle 100 by a cylindrical collar 120 which is the same size as the sleeve 116 and abuts the end thereof and is received on the end of the axle 100 with a retaining pin or bolt 122 extending through the collar 120 and the end of the stud axle 100, thereby securely mounting the frame or beam 102 on the stud axle 100 and permitting removal thereof when desired.

Each of the vertical interconnecting members 110 includes a projecting stud axle 124 thereon which is reinforced by gusset plates 126 and has a hub or spindle assembly 128 on the outer end thereof for mounting a wheel rim assembly 130 thereon with each wheel assembly 130 including a pneumatic tire 132 thereon. Thus, as illustrated in FIG. 2, the rotational axes of the tires 132 are spaced equally from the rocking axis defined by the stud axle 100 with the frame or walking beam assembly 102 causing corresponding downward force on one of the tires when the other tire is moved upwardly so that the supporting forces imparted to the cart will be divided between the two tires 132 and the two rims 130 on each side of the cart.

For guiding the movement of the ends of the frame or walking beam 102, a guide plate 134 is provided in spaced parallel relation to the side frame 18 and is disposed along the outer surface of the vertical members 108. The guide plate 134 is supported by bracket members 136 rigidly fixed to the frame member 18 and extending laterally therefrom are spaced bracket members 138 having fasteners 140 extending therethrough which also extend through the plate 134. To limit the upward swinging movement of the ends of the frame or walking beam 102, the lower end of each end member 108 is provided with an inwardly extending stop plate 142 which extend perpendicularly from the member 108 and is disposed in underlying relation to the frame 18 as illustrated in FIG. 3 so that as the frame or walking beam pivots upwardly at one end thereof, the stop plate or lug 142 will limit such upward movement by contact with the under surface of the frame 18.

This arrangement enables the weight of the larger capacity cart to be carried smoothly over rough places, such as a levee 144 employed in rice fields, and the like. The oblong shape of the cart is formed by taking a funnel, cutting it transversely in two pieces lengthening it in the middle, thus leaving it the same width but longer, thereby providing a large capacity with the center of the bottom being relatively straight. In order to provide this area with sloping surfaces, the partition is provided so that the grain will go either to the front or the rear of the cart. The two unloading augers converge upwardly and discharge in one pile to enable the operator to control the grain while loading it into the truck.

If a greater capacity hopper is needed, it can be made longer and the cross divider may be extended higher in the middle of the hopper while maintaining the correct slope to make the grain slide to the front or rear. By employing two unloading augers, the use of a bottom unloading auger has been eliminated along with the problems caused by using such bottom augers. This arrangement of the hopper or body construction enables the width and heighth to be retained at a desired level while keeping the necessary angle to slide the grain and obtaining the larger capacity by using the center divider and dual unloading augers which also enables faster unloading of the cart. If the capacity were increased by extending the body to a higher level, the combine may not be able to unload the grain into the cart and, in addition, a more unstable cart would be formed that has a higher center of gravity when loaded and more subject to tilting over in the event of traversal of irregular or sloped surfaces. While a hinged auger or structure is known, it is effective in this combination to enable the device to be pulled into areas having low overhanging obstructions. The grain being discharged into the truck at substantially one point enables the truck driver to more effectively keep the grain pushed down level as the truck fills as compared to the dumping of grain in separate piles. This enables the load to be more expediently finished and enables the truck driver to keep the level of the grain level during the filling operation.

The tandem wheel assembly and rocking axle arrangement provides additional tires for carrying the extra load capacity and also enables the tractor and cart to cross rice levees easier without jerking the tractor and splashing grain off of the top of the load. The wheels actually crawl over a levee or high place with the top of the cart staying substantially level rather than jerking or tilting as occurs when rigid axles are used.

While an oval-shaped configuration of the invention has been illustrated, it is pointed out that the over-all configuration of the cart could be rectangular with the hopper having straight transverse front and rear ends with the sloping portions 36 being correspondingly shaped but maintaining an angle greater than the angle of repose of the grain involved. The folding capability of the augers not only cuts down the width and heighth for movement in restricted areas, but also enables the cart to be placed in an ordinary shed when loaded, such as might be required at night or during a period of rain and also enables the cart to be more readily stored in a conventionally shaped shed during periods of nonuse.

It is also pointed out that the augers can be driven be hydraulic motors or by combination of hydraulic motors, gear boxes, and the like, with the hydraulic motors enabling an adjustment in the rate of unloading of the cart so that the top portion of the load in a truck can be loaded slower, thereby enabling more accurate loading of the truck without spillage of grain.

The spindles on the walking beam or frame may be equally spaced from the pivot axis of the tandem assembly or, in some instances, the front wheel may be spaced from 2 to 4 inches further from the pivot axis of the walking beam than the rear wheel to enable the cart to be towed more easily while still maintaining the cart in substantially a level condition which eliminates the problem of the load shifting to the lowermost wheel or wheels when the cart tips or tilts, which has resulted in the wheels or spindles being bent.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is new is as follows:

1. A grain cart comprising a body defined by a peripheral wall having an upwardly opening upper end, a frame supporting said body, conveyor means associated with the lower end of the body for unloading grain therefrom, and an independent tandem wheel assembly associated with each side of the frame for supporting the frame and body for movement over irregular surfaces to enable the cart to traverse levees or other irregularities in an angular direction without excessive tilting of the body and spilling of grain therefrom, each tandem wheel assembly including a pair of wheels with pneumatic tires thereon, as elongated beam structure, spindle means supporting the wheels adjacent opposite ends of the beam structure, means centrally of the beam structure rockably supporting the beam structure from the cart frame, limit stop means on the end of the beam structure for engagement with the cart frame for limiting the rocking movement thereof, and guide means on the cart frame associated with the beam structure for preventing excessive lateral deflection of the end portion of the beam structure.

2. The structure as defined in claim 1 wherein said body is of elongated, oval-shaped configuration in plan and provided with a sloping inner surface at an angle greater than the angle of repose of the grain disposed within the body.

3. The structure as defined in claim 2 wherein said body includes a pair of longitudinally spaced and aligned discharge openings in the bottom thereof, an inverted V-shaped partition in the body having the lower edges thereof coincidental with the adjacent edges of the discharge openings to form a partition with inclined walls greater than the angle of repose of the grain thereby providing gravity feed to the discharge openings in the body.

4. The structure as defined in claim 1 wherein said frame includes a hitch at the forward end thereof for connection with a towing tractor, said hitch including a swivel connection for swivel movement about a longitudinal axis thereby preventing transfer of twisting forces between the cart frame and tractor.

5. The structure as defined in claim 1 wherein said conveyor means includes a pair of conveyor assemblies communicated with the bottom portion of the body and extending upwardly above the top edge of the body and including discharge means for discharging grain into a truck body, said conveyor assemblies converging upwardly for discharging grain in substantially a single pile within the truck body to facilitate the loading of the grain into the truck body.

6. The structure as defined in claim 5 wherein each conveyor assembly is in the form of an auger, the upper end portion of each of the augers being pivotally supported for movement to a horizontal position, prop means securing the upper end portion of each of the augers in horizontal position to enable the cart to proceed under overhanging obstructions, each auger including a drive gear assembly connected to the lower end thereof, a single shaft driving said drive gear assemblies from a forwardly extending drive shaft adapted to be connected to the power take-off of a towing tractor.

* * * * *